US011425672B2

(12) United States Patent
Mayer

(10) Patent No.: US 11,425,672 B2
(45) Date of Patent: Aug. 23, 2022

(54) METHOD, APPARATUS AND SYSTEM FOR SYNCHRONIZING A SATELLITE NETWORK

(71) Applicant: Michael Mayer, Ottawa (CA)

(72) Inventor: Michael Mayer, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 86 days.

(21) Appl. No.: 17/099,917

(22) Filed: Nov. 17, 2020

(65) Prior Publication Data

US 2022/0159601 A1 May 19, 2022

(51) Int. Cl.
*H04W 4/021* (2018.01)
*H04W 56/00* (2009.01)
*H04J 3/06* (2006.01)

(52) U.S. Cl.
CPC ....... *H04W 56/0035* (2013.01); *H04J 3/0641* (2013.01); *H04W 56/001* (2013.01)

(58) Field of Classification Search
CPC .......... G01S 19/26; G01S 19/23; G01S 19/39; G01S 5/021; G01S 19/235; G01S 19/14; G01S 19/073; G01S 19/21; G01S 19/45; G01S 19/20; G01S 19/215; G01S 19/115; G01S 19/258; G01S 19/12; G01S 19/254; G01S 5/14; G01S 19/256; G01S 19/51; G01S 19/38; G01S 19/06; G01S 19/37; G01S 19/00; G01S 19/421; H04W 12/122; H04W 4/029; H04W 4/023; H04W 4/021; H04W 64/00; H04B 7/18513

See application file for complete search history.

(56) References Cited

PUBLICATIONS

Katayama. M et al., "Carrier Synchronization Under Doppler Shift of the Nongeostationary Satellite Communication Systems," [Proceedings] Singapore ICCS/ISITA '92, Singapore, vol. 2, 1992, pp. 466-470.
Ali, I. et al., "Doppler Characterization for LEO Satellites," IEEE Transactions on Communications, vol. 46, No. 3, pp. 309-313, Mar. 1998.
Naeem, U. et al., "Doppler Shift Compensation Techniques for LEO Satellite On-board Receivers," Proceedings of 2012 9th International Bhurban Conference on Applied Sciences & Technology (IBCAST), Islamabad, Pakistan, Jan. 12, 2012, pp. 391-393.
Tian, D. et al., "Frequency Offset Estimation for 5G Based LEO Satellite Communication Systems," 2019 IEEE/CIC International Conference on Communications in China (ICCC), Changchun, China, 2019, pp. 647-652.

*Primary Examiner* — Jung Liu

(57) ABSTRACT

A method and apparatus for synchronizing the oscillators onboard satellites of a same network, while minimizing relativistic effects. The method consists of identifying a reference signal having minimal Doppler frequency shifting; adjusting the frequency of an ovenized oscillator to the minimally shifted reference signal, and repeating the process for all satellites of a satellite train having a similar orbital path. Subsequently, the clocks on board the satellites of a same train can be set to a same time, by relaying a clock synchronization protocol between the satellites. The method includes a number of error measurement techniques allowing to further compensate for relativistic effects and make further corrections over time.

20 Claims, 12 Drawing Sheets

METHOD, APPARATUS AND SYSTEM FOR SYNCHRONIZING A SATELLITE NETWORK

FIELD OF THE INVENTION

The present invention pertains to satellite technology in general and in particular to a method, apparatus and system for synchronizing a satellite constellation in support of next generation networks, for example in support of universal broad-band access.

BACKGROUND OF THE INVENTION

There is increased interest in the use of massive constellations of low Earth orbit satellites to provide broadband and mobile services.

While telecommunication services have been supported by satellites for some time, they have primarily relied on the use of satellites in geosynchronous orbit (GEO) as these simplify the ground tracking systems required. However, because GEO satellites are at a fixed orbit of approximately 36,000 km, the resulting round-trip signal delay is significant and becomes problematic for many services and data protocols. Low Earth orbit (LEO) and medium Earth orbit (MEO) satellites can significantly reduce service delays and can provide a service level that is comparable to or better than the delay incurred over a terrestrial fibre-optic network.

The orbit period of a LEO satellite is approximately two hours. Thus, an individual satellite is visible to a ground-based user for only a short period of time. Due to its close proximity to the surface of the earth, the resulting coverage area is also smaller than that of a satellite at higher altitudes. Providing a uniform and continuous telecommunication service therefore requires the ability to operate the service over multiple satellites, which includes carrying traffic over inter-satellite links. A constellation of satellites can be viewed as a data network with links between network nodes being implemented for example using free-space optical transmitters and receivers.

As with terrestrial data networks, each network node, i.e., satellite, is required to maintain an accurate time-base. The time-base may correspond to electronic circuitry providing a reference oscillating waveform (e.g. a clock process) according to which timing-critical operations, such as communication operations, are performed. It is desirable for the time-base of each satellite to be synchronized in frequency, phase and cycle count. The frequency and phase refer to the respective characteristics of the oscillating waveform. The cycle count refers to the agreement, between satellites, of the number of repeated cycles of the waveform that have occurred since a reference "zero" time.

The time-base in a satellite, or in other general data processing elements such as computers, relies on an internal oscillator. Due at least to clock drift, the time-base typically requires periodic updates from a precise time-source, in a similar manner to a personal computer (PC) relying on periodic updates from reference clocks for example using the network time protocol (NTP). Overall accuracy depends on systemic factors. For terrestrial networks, accuracy can be increased by the use of a dedicated time and frequency distribution network, or via use of another time source such as the global positioning system (GPS). However, the use of such mechanisms is not feasible in a LEO network and satellites must rely for significant periods of time on free-running oscillators. Further complicating matters is that oscillator accuracy is subject to relativistic effects.

For satellites that require highly accurate time-bases, such as the GPS navigation satellites, very accurate atomic oscillators (e.g. Rubidium or Cesium oscillators) are used, together with extensive ground control systems. However, such methods are considered far too costly to be applied to massive LEO constellations intended for telecommunications networking. Reliance on less costly oscillators can reduce the time-base accuracy and thus reduce efficiency of a satellite based data network.

Therefore, there is a need for a method, apparatus and system for synchronizing a satellite constellation in support of next generation networks that is not subject to one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

The present invention pertains to the adjustment or synchronization of clocks aboard satellites, for example belonging to a satellite network. Embodiments of the present invention pertain in particular to methods, apparatus and systems using the Doppler frequency shift in received ground signals to adjust a clock in a satellite receiver to correct a satellite's clock.

Embodiments of the present invention use measurements, made by a satellite, of Doppler frequency shift (also referred to as Doppler shift) in a reference signal, to adjust a satellite-based clock. Multiple measurements of reference signals from multiple known land-based stations can be used, to perform a clock frequency correction operation. Messages can then be exchanged between multiple satellites to synchronize multiple satellite clocks. Embodiments of the present invention correct for the relativistic effects of time-dilatation and gravitational red-shift, and can be adapted for use on multi-shelled satellite constellations.

Embodiments of the present invention pertain to methods, apparatus and systems for synchronizing a satellite-based oscillator where relativistic effects are significant. First, ground stations each emit constant-frequency reference signals receivable by a satellite. Then a processor onboard the satellite monitors and processes the reference signals to determine a time when the Doppler shift inherent in the reference signal is minimal (zero). The time when the Doppler shift is minimal can be identified as a time when the rate of change in the Doppler shift is minimal (largest observed negative value). This time corresponds to an actual time of closest approach to the ground station emitting the reference signal. The processor then adjusts a clock of the satellite based on this information.

For example, the actual time of closest approach to the ground station (as measured by an internal satellite clock) can be compared to an expected time of closest approach to the ground station. If the ground clock is of known accuracy, this time difference can be attributed to an error in the satellite's clock, and an appropriate correction factor can then be applied to the clock to compensate for a timing error. Adjusting a satellite clock's can include adjusting an oscillator frequency of the clock, adjusting a cycle count or "zero" reference time of the clock, or a combination thereof. In various embodiments, once the oscillator in each satellite of a train of satellites having a same altitude and trajectory has been independently synchronized to a same ground frequency, the satellites can transmit and communicate timing information with one or more other satellites to synchronize the clocks of the satellite and other satellites. Further adjustments and corrections can therefore be applied within the satellite train.

Embodiments of the present invention enable the synchronization of clocks within a satellite network so that a common time-base can exist in all satellites within the constellation.

Embodiments of the present invention provide for a method for adjusting timing of a clock internal to a satellite in motion relative to ground. The method includes monitoring, by the satellite, for one or more constant-frequency reference signals transmitted respectively by one or more base stations located on ground. The method includes determining a first set of times. Each time is a time at which a negative rate of change in observed frequency of a corresponding one of the reference signals is maximized. The change being due to Doppler effects resulting from motion. The method includes determining a timing error of the clock based at least in part on a comparison of the first set of times with an expected set of times indicative of expected values of the first set of times. The method includes adjusting the clock to compensate for the timing error.

Embodiments of the present invention provide for a satellite apparatus comprising a clock, processing electronics and a radio interface. The apparatus is configured to monitor, using the radio interface, for one or more constant-frequency reference signals transmitted respectively by one or more base stations located on ground. The apparatus is configured to determine, using the processing electronics, a first set of times. Each time is a time at which a negative rate of change in observed frequency of a corresponding one of the reference signals is maximized. The change is due to Doppler effects resulting from motion. The apparatus is configured to determine, using the processing electronics, a timing error of the clock based at least in part on a comparison of the first set of times with an expected set of times indicative of expected values of the first set of times. The apparatus is configured to adjust, using the processing electronics, the clock to compensate for the timing error.

In some embodiments, the one or more reference signals include three or more reference signals transmitted respectively by three or more of said base stations.

In some embodiments, the monitoring includes monitoring for a first reception of said one of the constant-frequency reference signals during a first pass over a corresponding one of said base stations, and monitoring for a second reception of said one of the constant-frequency reference signals during a second, subsequent pass over said corresponding one of said base stations. In some further embodiments, one of the first set of times corresponds to the first reception, and another one of the first set of times corresponds to the second reception.

In some embodiments, the expected set of times is determined based on orbital dynamics information for the satellite. In some further embodiments, the orbital dynamics information includes one or more of: an altitude of the satellite; an orbital speed of the satellite; and an orbital direction of the satellite.

In some embodiments, adjusting the clock includes adjusting a frequency of the clock.

In some embodiments, following said adjusting the clock, timing information is communicated with one or more other satellites to synchronize clocks of the satellite and the other satellites. In some further embodiments, the satellite and the one or more other satellites are located at a same altitude, a same orbit, or both. In some further embodiments, synchronizing the clocks includes electing a master clock belonging to one of said clocks and synchronizing all of said clocks with the master clock. In some further embodiments, synchronizing all of the clocks with the master clock includes a series of synchronization operations. Each successive synchronization operation includes synchronizing one of the clocks with another clock which was synchronized in an immediately previous one of the synchronization operations. A satellite holding the master clock is configured to monitor for an accumulated error occurring in a clock synchronized according to a last one of the series of synchronization operations. Further clock adjustment, clock synchronization, or both, is performed when the accumulated error is above a predetermined threshold.

In some embodiments, communicating timing information occurs after clocks of the satellite and said other satellites are synchronized in frequency, and wherein synchronizing said clocks comprises synchronizing a time offset for the clocks. Some embodiments further include synchronizing the clocks with a clock located on ground by exchanging one or more messages with one or more of the base stations.

According to an embodiment of the present invention, there is provided a method of synchronizing a plurality of clocks. Each one of the plurality of clocks is internal to a corresponding one of a plurality of satellites. The method includes electing a clock from the plurality of clocks to be a master clock. The method includes communicating timing information between the master clock and other ones of the plurality of clocks, to synchronize the plurality of clocks. Each satellite of the plurality of satellites is positioned at a same altitude, a same orbit, or both.

According to an embodiment of the present invention, there is provided a system comprising a plurality of satellites, each having a respective one of a plurality of clocks. The system is configured, by operation of one or more of the plurality of satellites, to elect a clock from the plurality of clocks to be a master clock; and communicate timing information between the master clock and other ones of the plurality of clocks, to synchronize the plurality of clocks. Each satellite of the plurality of satellites is positioned at a same altitude, a same orbit, or both.

In some embodiments, the timing information includes information used to time-align the plurality of clocks. In some embodiments, the plurality of clocks are synchronized in frequency prior to performing the method or above-mentioned operations of the system. In some embodiments, the timing information includes information used to synchronize the plurality of clocks in frequency. In some embodiments, the plurality of satellites are relatively stationary relative to one another and non-stationary relative to ground. In some embodiments, communicating the timing information comprises transmitting one or more time stamp messages from the master clock to said other ones of the plurality of clocks, said other ones of the plurality of clocks configured to adjust to time-align with the master clock based on the one or more time stamp messages. In some embodiments, communicating the timing information comprises sequentially relaying at least one of the one or more time stamp messages between neighboring ones of the plurality of satellites. In some embodiments, the plurality of satellites are substantially at a same altitude and a same orbit; and their number is sufficient to form a ring of satellites around the Earth, such that each satellite can communicate with at least two neighboring satellites. In some embodiments, synchronizing the plurality of clocks is performed using a network time protocol (NTP) or a precision time protocol (PTP).

Embodiments of the present invention are potentially applicable to satellite networking, including 5G (Non-Terrestrial Networks, both fixed satellite service and mobile satellite service) and fixed satellite broadband.

DETAILED DESCRIPTION OF THE INVENTION

Figure 1:
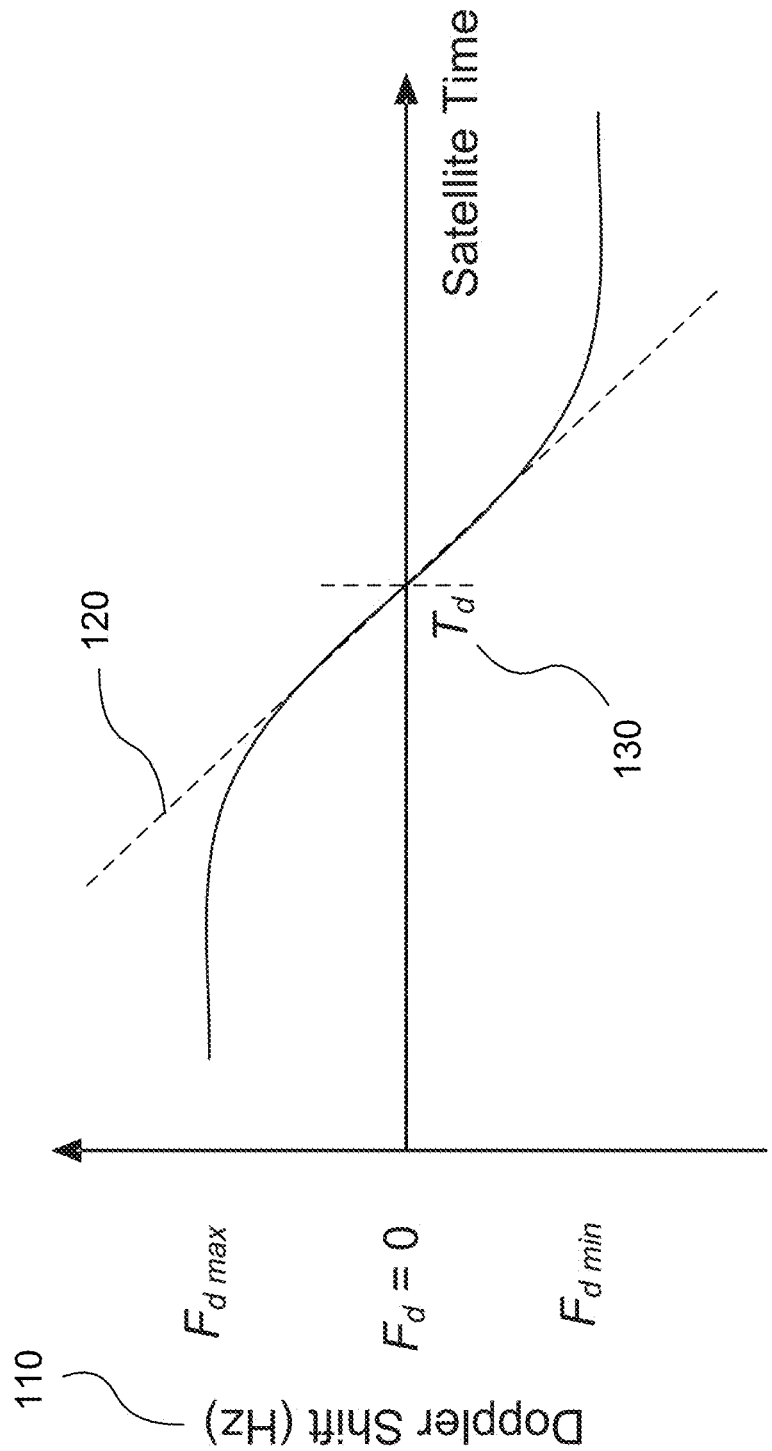
FIG. 1 is a graph showing the Doppler shift of a signal from a ground station received by a passing satellite, as a function of time, in accordance with embodiments of the present invention.

The satellites used for telecommunication applications have so far been used mainly in a bent-pipe configuration or in cases where limited networking capability exists. In order to provide ubiquitous service with service levels matching, or in some cases, exceeding those provided by terrestrial technology, LEO satellites are being deployed. These now require networking at the satellite level. Satellite networks are expected to become an integral part of the data network. As such, satellites may need to perform the necessary routing and switching functions that are performed today in terrestrial networks. It is expected that certain functions are similar. However, for some critical functions such as routing, the satellite network represents a considerably different network topology, due to satellites' continuous motion relative to the ground and to one another. Frequent network rearrangement is a characteristic of such networks and this can potentially result in degradation of performance, because of the need to continually update topology information. The predictable motion of the satellites can allow network node adjacencies to be predicted. In many cases, routing updates can be predicted for the entire network and the satellites can prepare routing tables that are valid for a pre-defined period. At first, this can appear to be straightforward. However, for this to function optimally, all satellites should be synchronized in time to allow each satellite to switch tables within a time interval that is sufficiently small. As with a terrestrial data networks, utilizing a network of satellites as a data network requires that each node of the satellite network maintain an accurate time-base, driven by an (internal) oscillator clock process. However, because the oscillators located in satellites are subject to relativistic effects, such synchronization can be difficult.

There are a number of issues, particular to satellite networks, that makes synchronization challenging. In many networks, the need for a stable frequency reference signal to drive each clock can be provided via a reference network clock. However, this requires a direct and stable network connection, which does not necessarily exist in a satellite network that's always in motion. Also present are relativistic effects, which are significant when a highly accurate oscillator travels at the high speed and altitude of an orbiting satellite. In particular, these include gravitational redshift due to high altitude, time dilation due to high speed, in turn due to its LEO, and the relativistic Doppler Effect, also known as Doppler shifting for electromagnetic waves. Doppler frequency shifting refers to the (subtractive) difference between the frequency of an electromagnetic wave as emitted, and the frequency of the same wave as received, when the emitter and receiver are moving towards or away from each other, such as when a satellite approaches and then recedes away from a ground station or another satellite. That is, when the frequency of a signal as emitted by a transmitter is $f_e$ and a receiver observes the frequency of the signal as $f_r$, the difference $f_e - f_r$, which is nonzero due to relative motion of the transmitter and the receiver, is referred to as the Doppler frequency shift. Because of satellite's high speed and the oscillator's high precision, the relativistic version of the Doppler Effect can be assumed. However, similar challenges are present even when the non-relativistic formulation of the Doppler Effect is considered.

Gravitational redshift becomes particularly problematic when a clock is elevated to an altitude on the order of thousands of kilometers. Compensation for gravitational redshift can be performed by pre-offsetting the clock frequency at ground level before deployment. A similar compensation can be made to account for time dilatation due to a satellite oscillator's high speed. However, such pre-compensation assumes that the operating altitude is known before deployment, and will remain fixed. Moving satellites to different altitudes requires reconfiguration of the oscillators, which may not be possible, especially because oscillators in orbit degrade with age or radiation effects.

While an accurate clock can be deployed at a ground-station where power is reliably available and the operational environment is considered stable, the communication links connecting ground stations to satellites do not offer the same stability as the communication links of a terrestrial system. Compounding the problem is that the links between a ground station and a satellite are subject to the electromagnetic Doppler frequency shift, which hinders the ability of a satellite receiver to extract timing information. Satellite receivers typically attempt to compensate for Doppler shifting for the purposes of data recovery, but this is a relative timing issue and it may not be possible to use this information to make meaningful long-term adjustments to the satellite clock's own time-base.

When a satellite approaches a ground-station which is emitting a signal having a constant frequency over time, the frequency of the ground station's signal as received by the satellite is blue-shifted (increased) during most of the satellite's approach and red-shifted (decreased) as the satellite moves away. As a function of the satellite's position, the shifting is characterized by an s-shaped curve (see e.g. FIG. 1), in which the magnitude of the frequency shift depends on the relative speed between the transmitting station and the receiving satellite.

In embodiments of the present invention, it is recognized that as the signals to the satellite go from being blue-shifted to being red-shifted, there is at least one point at which the signal received by the satellite has a frequency that is substantially identical to the frequency emitted by the transmitter. This is the point at which the Doppler shift becomes minimal for an instant at the transition between blue-shift and red-shift. Accordingly, the Doppler frequency shift due to Doppler Effect is minimized (actually momentarily nullified) when the two nodes are at their closest in a "fly-by" trajectory. However, without knowledge of the transmission channel's geometry, the receiver cannot determine exactly when the point of minimal Doppler Effect (and corresponding minimal Doppler frequency shift) occurs, because such measurement relies on the use of an accurate frequency reference.

FIG. 1 is a graph showing the Doppler shift (frequency difference) 110 between a constant frequency signal as transmitted by a ground station, and the same signal as received by a receiver onboard a satellite, as a function of time. The signal can be a modulated or unmodulated carrier wave at a predetermined constant frequency for example. Although the transmitter doesn't change its emission frequency, the received signal is observed, by the satellite, as having a higher frequency while the satellite approaches the ground station, and is observed, by the satellite, as having a lower frequency while the satellite retreats. Therefore the Doppler shift transitions from positive to negative. The difference between the frequency of the signal as measured by the satellite receiver at a given time, and the constant frequency of the signal as emitted by the ground station, is due to the Doppler Effect. A maximum rate of change (i.e. slope) 120 in the Doppler shift occurs at the satellite's time $T_d$ 130, which is also the time when a signal having the minimum Doppler shift is received by the satellite. The minimum Doppler shift occurs because the satellite switches from moving toward the ground station to moving away from the ground station. (For clarity, the term "maximum rate of change" is used here to denote the maximum absolute value of the rate of change in the Doppler shift, noting that the rate of change in FIG. 1 is typically interpreted as a negative value due to having downward slope from left-to-right.) Time $T_d$ 130 is a time at which the satellite switches from moving toward the ground station to moving away from the ground station and is thus a time of closest approach i.e. at time instant $T_d$ 130 the satellite can be said to be neither moving toward or away from the ground station and hence the (absolute value of the) Doppler shift of the signal received at that point is minimal.

The (negative) rate of change of the Doppler frequency shift is maximized when the distance between the satellite and the ground station is minimized. This occurs when the satellite is at a certain culmination point over the ground station. Utilizing this, together with the precise geographic location of the ground-stations, which should be known a priori, and the fact that for a circular orbit or for the period of time during transit, the speed (i.e. the magnitude of velocity) of the satellite is constant, the satellite can, given known orbital parameters, determine the error present in its internal clock. If all satellites perform such an error determination and subsequent error correction, then the satellite network can become synchronized in clock frequency, also known as being "syntonized". Accordingly, the satellite can be configured to determine the time at which the absolute value of the rate of change of signal frequency is maximized, rather than determining the time when the amount of frequency shift is minimized.

In clocks generating timing signals, two key components are: a form of oscillator, and a counter or mechanism for counting the oscillations. The output of a counter is usually, but not necessarily, expressed in terms of familiar time units such as seconds, minutes, or hours. Synchronizing two clocks involves a process that results in the output of two clocks expressing the same count value and change, at the same time. It should be noted, however, that the accuracy of a clock is fundamentally dictated by the behaviour of its oscillator. For certain technologies, an oscillator frequency will drift with temperature changes and with aging. Regardless of technology, a clock deployed on a satellite will be subject to the relativistic effects and because of that, the synchronization process may need to be repeated on a regular basis to ensure a desired level of accuracy is maintained.

When highly accurate synchronization is required in terrestrial network applications, such as telecommunication networks or power grid management networks, the issue of internal oscillators having performance variations is resolved by providing timing via an external network-based clock source. This allows the high cost of accurate and stable oscillators to be shared between many network nodes. In many cases, the synchronization is enabled by extracting the timing information from an incoming data signal. For fixed terrestrial networks, however, the network nodes are fixed and thus the delays are stable. In some cases, temperature differences can occur on a diurnal basis, but they can be compensated for by using ovenized oscillators, where the temperature of the oscillation material is significantly above the ambient temperature and thus not impacted.

If all the satellites of a network have the same altitude and trajectory, they can be treated as a train of satellites having a common frame of reference in which relativistic effects between satellites are negligible. Thus, once the satellite clocks of such a train have been synchronized in frequency, they can then be made synchronous in time through bidirectional exchange of time stamps between the satellites. This is expected to result in a satellite network with a uniform time-base. For certain applications, such as where coordination of events within the constellation is the only concern, the time-base can be arbitrary. That is, the time-base can be particular to the satellite constellation, and not necessarily synchronized with an external time-base. It may be desirable, however, that the format should avoid the Year 2038 problem. In this case, the four-byte UNIX timestamp format can be extended to a U64 message, which has the added benefit of avoiding leap seconds.

If it is desired to have a satellite time-base synchronized in time with the ground-based or GPS-based universal coordinated time (UTC), then an additional process can be added to also provide time-synchronization by using, for example, precision time protocol (PTP) messages corrected at the satellite for Doppler shifting.

In an embodiment of the present invention, a minimum of three ground stations are used. Each ground station can transmit constant-frequency reference signals for use by satellites in clock synchronization. Each ground station may include a clock, a receiver circuit which receives and uses a signal from a central clock source, or a combination thereof. Each transmitting ground station can include its own clock, the timing of which is based on a common reference, which can be supplied by a timing network ("timing net"), or by another satellite navigation system such as GPS, Galileo, GLOSNASS, or BeiDou. The location coordinates of each ground station can be made known to the satellite network beforehand, either through transmission or by direct storage in the satellites. The ground station clocks are not necessarily used for initial satellite clock correction or even inter-satellite clock synchronization. Rather, in various embodiments, the ground station clocks are used later to synchronize satellite clocks with ground clocks. The ground station clocks can be omitted in some embodiments.

As a satellite makes a pass over a network of ground stations, it can repeatedly engage and disengage with (e.g. communicatively connect and disconnect with) individual ground stations. Because of its high speed, the satellite can pass over several ground stations in a short period of time. Satellites can re-engage with the same ground station or set of ground stations on different successive orbital passes. A LEO satellite typically has a period of about two hours. The projection of the satellite's path on the ground directly below is called its "ground path" and it may, but generally does not, coincide with the position of any particular ground station. From a ground station's perspective, the satellite travels from one point on the horizon, to a culmination point and finally to a second point on the horizon. When the satellite is at its (e.g. substantially overhead) culmination point, its distance to the ground station is at a minimum. Notably, when the satellite is at the culmination point, the signal transmitted by the ground station and received by the satellite has minimal Doppler shifting and minimal (i.e. maximal negative) rate of change in Doppler shifting.

Figure 2:
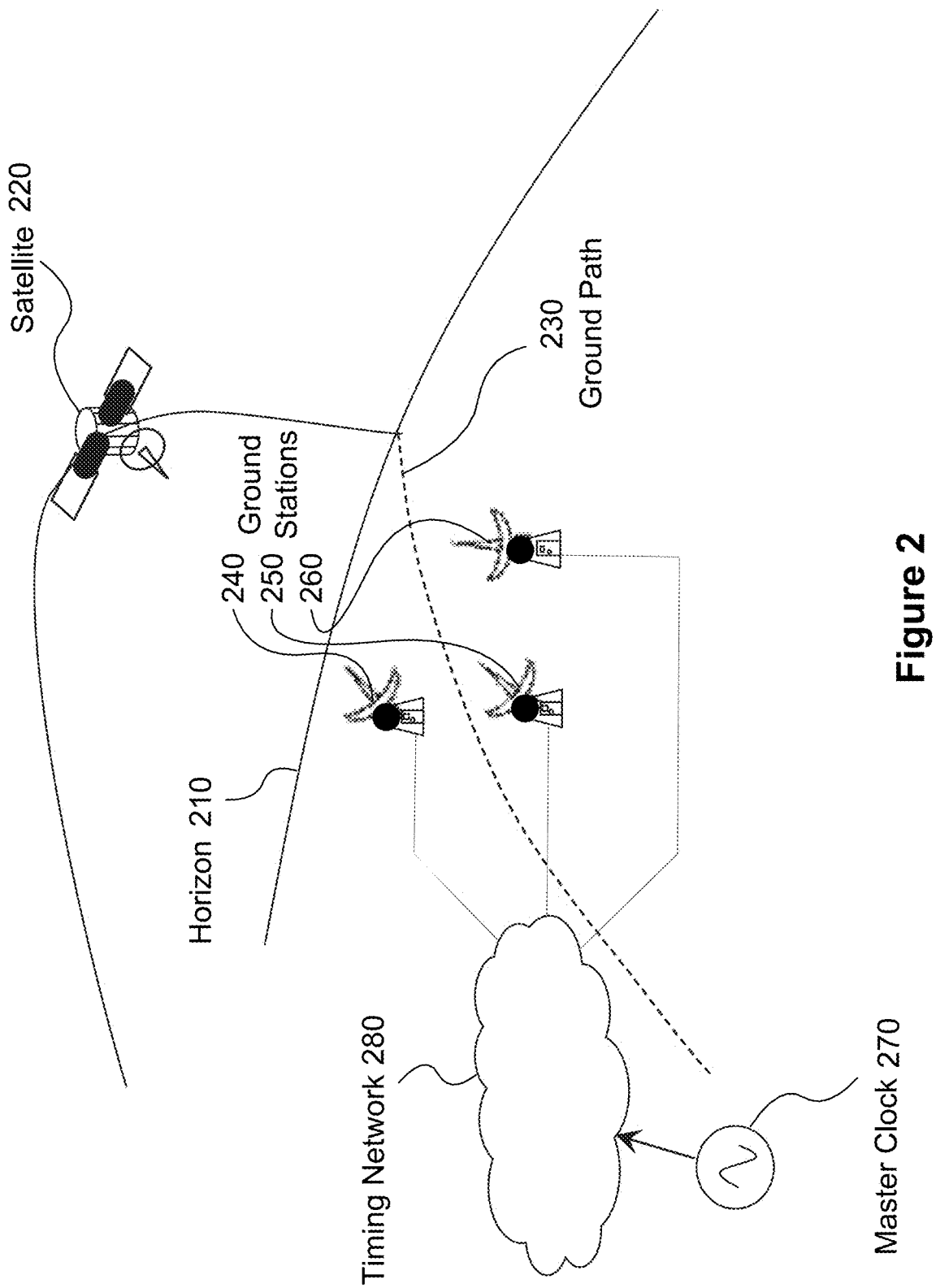
FIG. 2 illustrates a satellite tracing a ground path over a network of ground stations, in accordance with embodiments of the present invention.

FIG. 2 illustrates a view of the Earth horizon 210 and a satellite 220 tracing a ground path 230 over a network of ground stations 240, 250 and 260, from which it can receive signals. A master clock 270 synchronizes the clocks at ground stations through a timing network 280 by conventional methods.

Figure 3:
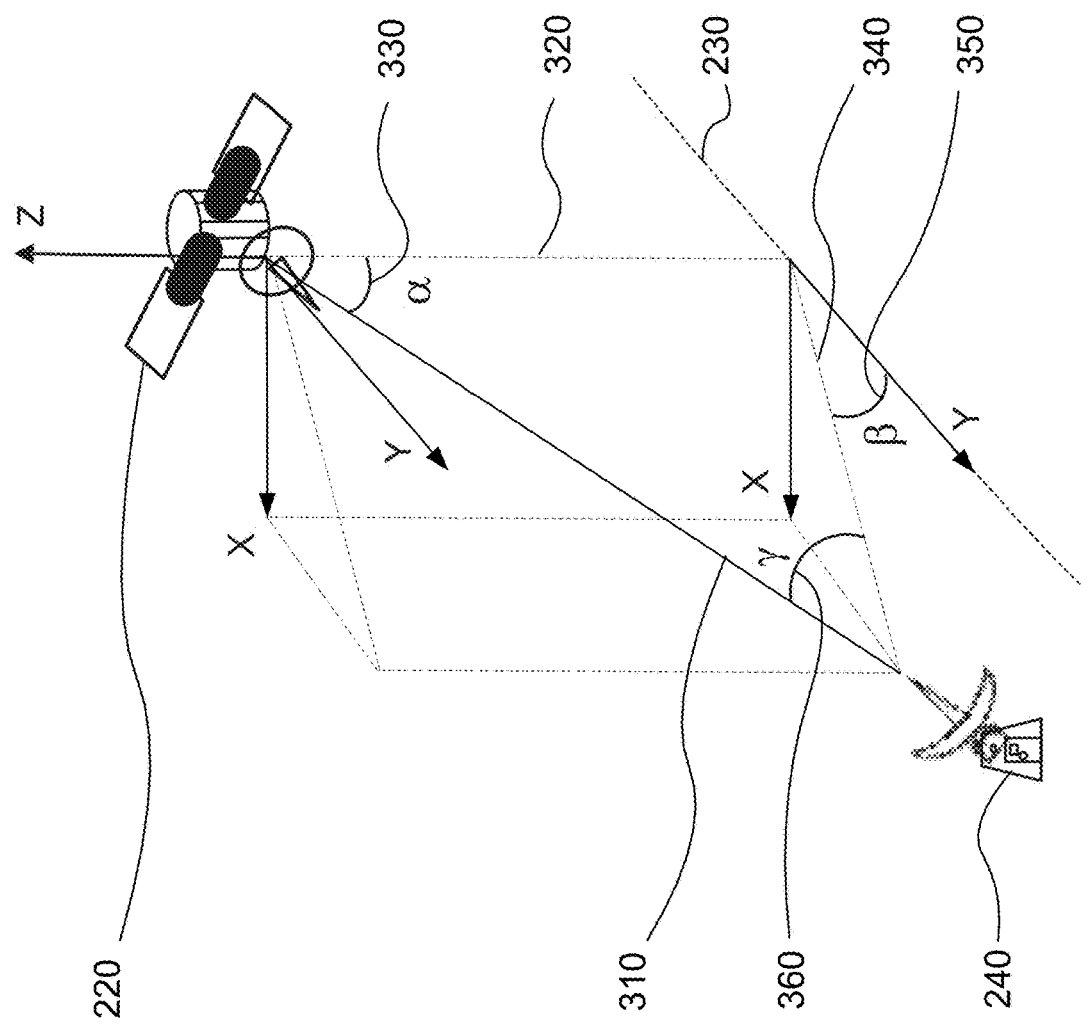
FIG. 3 illustrates the line of sight between a ground station and a satellite, as well as angles defining their positions relative to each other, in accordance with embodiments of the present invention.

FIG. 3 illustrates the line of sight 310 between a ground station 240, and a satellite 220 making a pass in the ground station's field of view. The angle between the line of sight 310 and a vertical line 320 from the satellite 220 to the ground path 230 is herein known as angle alpha α 330. The angle formed by the ground path 230 and the line of sight's projection on the Earth's surface 340 is called beta β 350. An angle of elevation γ 360 can also be defined between the line of sight's projection on the Earth's surface 340, and the line of sight 310.

As a satellite passes over a ground station, its transceiver, which can refer to one or multiple separate onboard transmitters and receivers, whether separate, partially integrated or fully integrated, can monitor for one or more constant-frequency reference signals transmitted respectively by one or more base stations located on ground. The monitoring process can include the satellite attempting transmissions to each ground station. The monitoring process can include the satellite monitoring its receiver for a predetermined signature, such as a wireless reference signal having a particular modulation pattern. For satellite communications, transceivers often employ Doppler compensation. Such transceivers can be modified to provide, for a signal returning to the satellite, a measurement of the Doppler shift's time-derivative, i.e. the rate of change of the signal's Doppler shift over time. The Doppler shift can be in a carrier frequency, in one or more other frequency components of the signal, or a combination thereof. The time-derivative of the signal's Doppler shift produces a waveform with a local minimum that aligns with $T_d$ 130 (FIG. 1), the time when the satellite is the minimum distance from the ground station. It is noted that the derivative is a local minimum at $T_d$ 130 because the derivative is negative—however the absolute rate of change can still be said to be maximum. A satellite can time-stamp the occurrence of $T_d$ 130 (at the minimum) using the unadjusted, arbitrary time-base present within the satellite. It is noted that the time derivative of the signal frequency, as received by the satellite, is substantially equivalent (possibly with sign reversal) to the time derivative of the Doppler shift in the signal as received by the satellite. This is because the Doppler shift is a difference $f_e - f_r$ between emitted and received signal frequencies, with the emitted signal $f_e$ being held constant over time. The derivative $d/dt(f_e - f_r) = 0 - df_r/dt = -df_r/dt$, yielding the equivalence (at least in absolute value).

Figure 4:
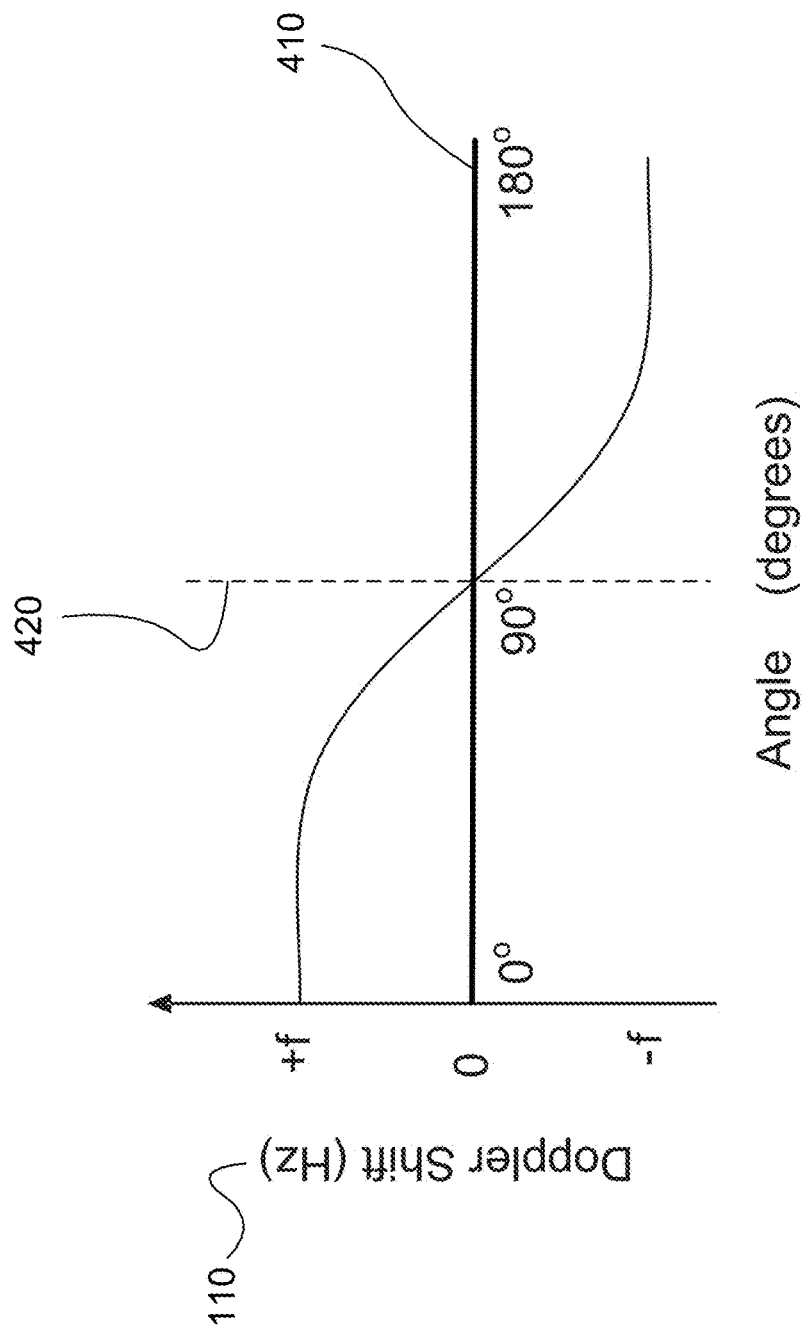
FIG. 4 is a graph showing the Doppler shift as a function of an angle defining a ground station's position in relation to a satellite passing over it, in accordance with embodiments of the present invention.

FIG. 4 is a graph showing the Doppler shift 110 in a constant frequency signal sent by a ground station and received by a receiver onboard a satellite. The horizontal axis shows the angle β 350 of the satellite relative to the ground station (or of the ground station from the satellite's perspective) ascending from the horizon as the satellite travels over its ground path 230. FIG. 4 is similar to FIG. 1 except that the horizontal axis represents angle rather than time. The angle β 350 covers values from approximately 0° to approximately 180° 410 as the satellite makes a pass. From either the ground station or the satellite's perspective, the distance between the ground station and the satellite has a minimum when the angle β 350 is equal to 90° (graph location 420). This results in the signals travelling between the ground station and the satellite having a minimum Doppler shift, and a maximum magnitude of the Doppler shift's time-derivative or rate of change, at graph location 420.

In an embodiment of the present invention, as a satellite makes a first pass over a series of three or more ground stations, the satellite can determine and time-stamp, for each ground station, the occurrence of a time $T_d$. The time $T_d$ is a time at which a negative rate of change in observed frequency of a corresponding ground station reference signal is maximized. This may be performed for each of the three or more ground stations. The satellite can therefore determine a first set of times $T_d$. The first set of times can include time stamps determined during a single orbital pass, or time stamps determined during multiple orbital passes. Time stamps determined during multiple orbital passes can include plural, separate time stamps determined from the same ground station.

A determination of a timing error is then made based on a comparison of the first set of times $T_d$ with an expected set of times (indicative of anticipated values of the first set of times). Once the timing error is determined, a satellite clock can be adjusted to compensate for the timing error.

The expected set of times can be determined based on orbital dynamics information for the satellite. For example, the satellite may include data indicative of its altitude, speed and direction. The satellite may include orbital dynamics information in the form of two-line element (TLE) data or other flight data. The expected set of times can be determined by the satellite's processor. For example, based on the orbital dynamics information, the satellite can determine the expected times (as measured by the satellite's internal clock) at which the satellite is expected to be located at each of a set of spatial coordinates. These spatial coordinates can be the points of closest approach to each of a plurality of ground stations (whose geographic locations are known a priori). When the expected set of times are not equal to the actual measured set of times $T_d$, it can be assumed that the inequality is due to clock imperfection, rather than due to a variation in orbital dynamics. A determination can then be made as to what clock time would result in the expected set of times being substantially equal to the actual measured set of times. The difference between the actual clock time and this determined clock time is the timing error. The clock can then be adjusted to correct or compensate for this timing error, by adjusting clock frequency, clock count, or a combination thereof. TLE data may be used to facilitate computation of the expected reception times of signals having the minimum Doppler shift, and therefore application of a correction factor to the satellite's time-base.

Figure 5:
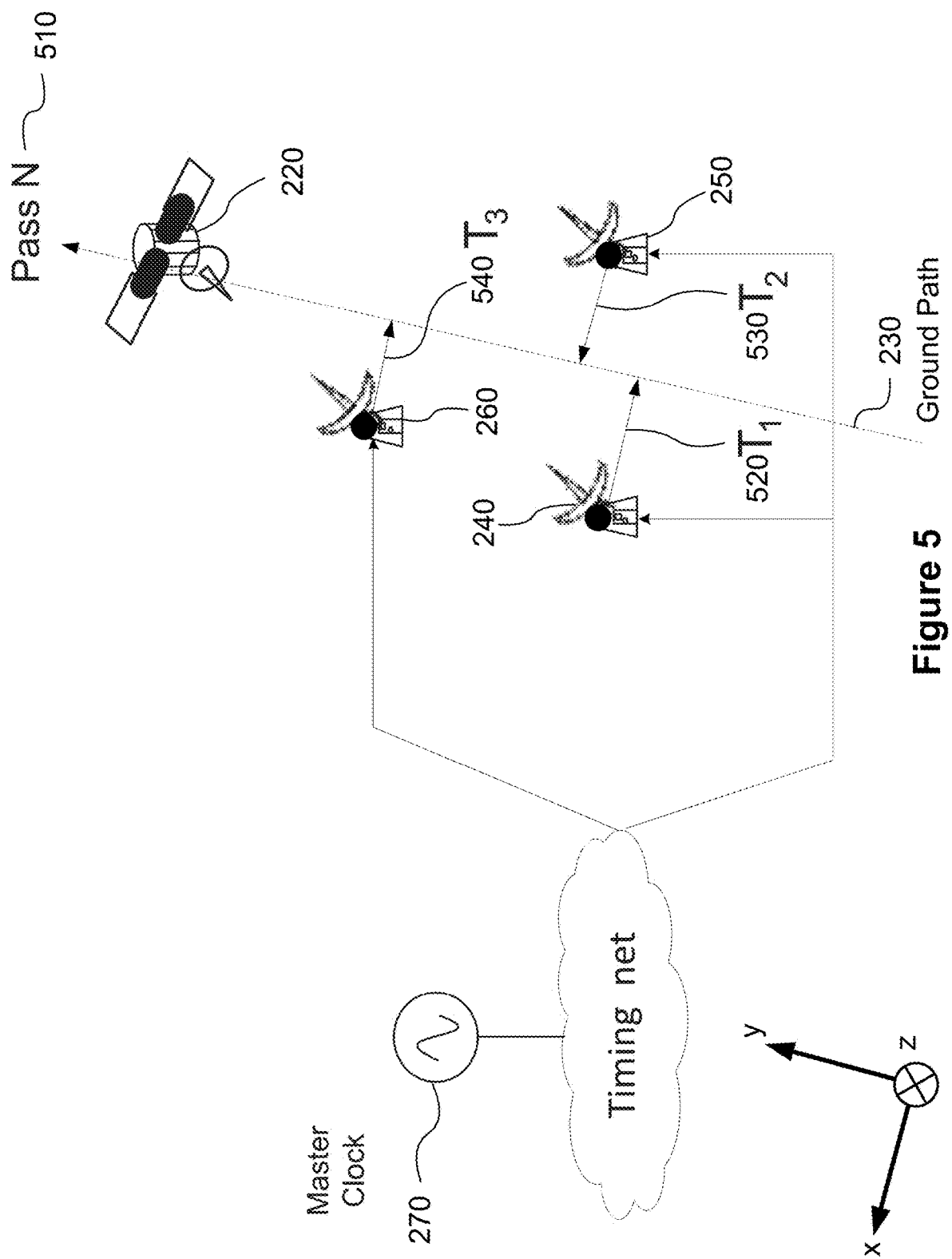
FIG. 5 illustrates a ground station and a satellite passing over it, in accordance with embodiments of the present invention.
Figure 6:
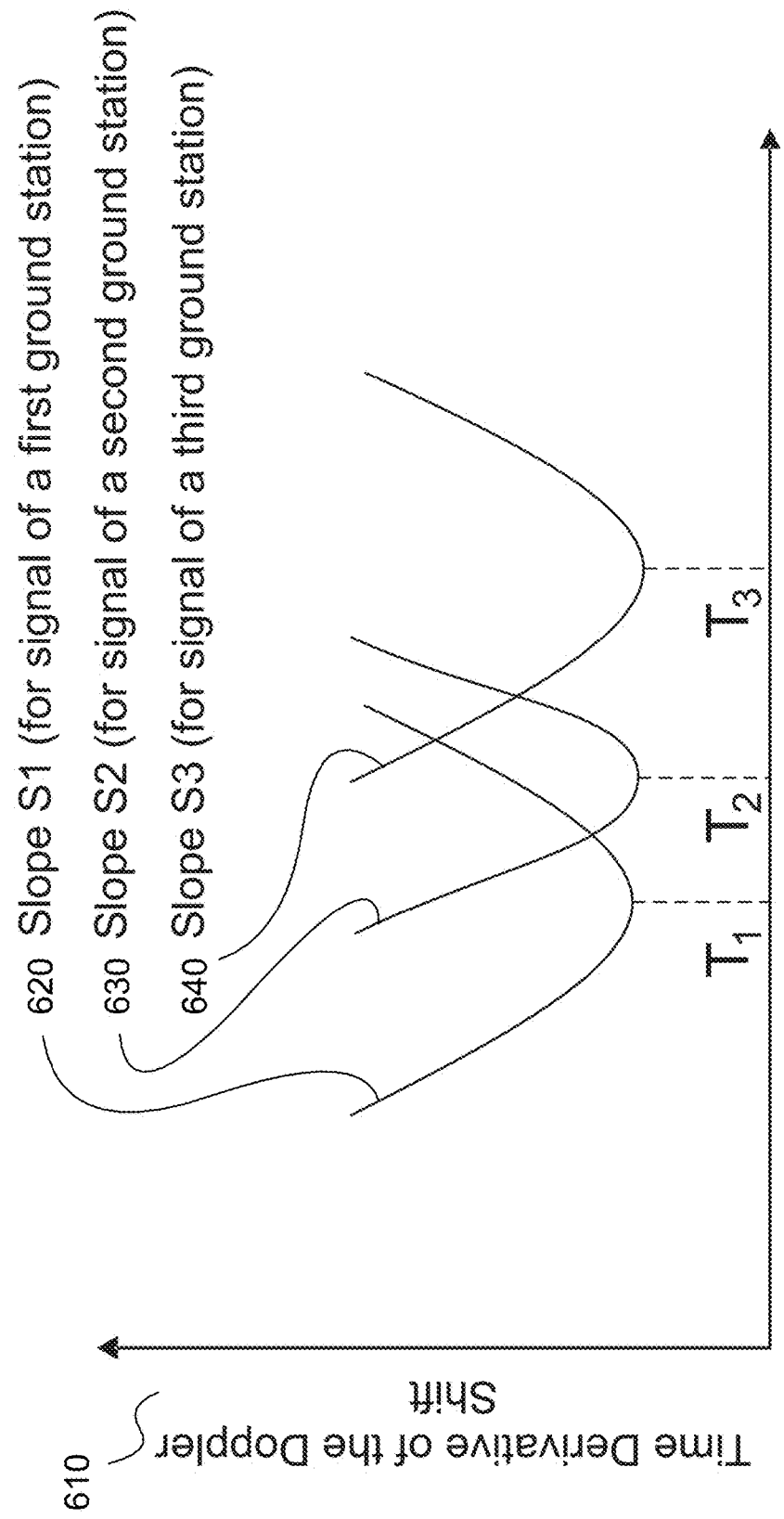
FIG. 6 illustrates the time derivatives of three signals undergoing Doppler frequency shifting, in accordance with embodiments of the present invention.

FIG. 5 is a schematic overhead view of a horizontal (x, y) plane on the Earth's surface, where a master clock 270 is used to synchronize clocks of three ground stations 240, 250, 260. On a single given pass N 510, a satellite 220 has a ground path 230 in the vicinity of the ground stations. During pass N 510, the satellite can determine, based on signals received from the respective ground stations, timing information $T_1$ 520, $T_2$ 530, and $T_3$ 540. The timing information is determined based on processing of Doppler shifting as illustrated in FIG. 6. Based on timing information $T_1$ 420, $T_2$ 430, and $T_3$ 440, and further based on information indicative of the orbit's topology the satellite 220's processor can determine a timing error for its internal clock. The processor can then determine a clock correction factor and implement a clock correction.

FIG. 6 is a graph showing three curves with respect to time. Each curve represents the time-derivative (slope) of the Doppler frequency shift 610, as a function of time, of the signal received by a satellite 220, as it passes over each of three ground stations 240, 250, 260, located near its ground path 230, as illustrated in FIG. 5. As each ground station 240, 250 and 260 emits a signal having constant frequency, a receiver on the passing satellite measures a frequency of each signal as received from each station. The frequency measurement changes over time. Accordingly, the frequency shift (i.e. the difference between signal frequency as emitted and signal frequency as received) also changes over time. Furthermore the time derivatives (i.e. rates of change with respect to time) of the frequency shifts also change over time, as illustrated.

In particular, curve $S_1$ 620 represents the slope (time derivative) of the Doppler frequency shift in the signal as received by the satellite from a first ground station 240, the frequency shift being the difference between the signal frequency as transmitted by the ground station and the signal frequency as observed by the satellite. This curve exhibits a minimum (i.e. maximum negative) value at time $T_1$, which is a time corresponding to the satellite's closest approach to the first ground station 240. Similarly, curve $S_2$ 630 represents the slope of the Doppler frequency shift in the signal as received by the satellite from a second ground station 250. This curve exhibits a minimum value at time $T_2$, which is a time corresponding to the satellite's closest approach to the second ground station 250. Curve $S_3$ 640 represents the slope of the Doppler frequency shift in the signal as received by the satellite from a third ground station 260. This curve exhibits a minimum value at time $T_3$, which is a time corresponding to the satellite's closest approach to the third ground station 260.

Figure 7:
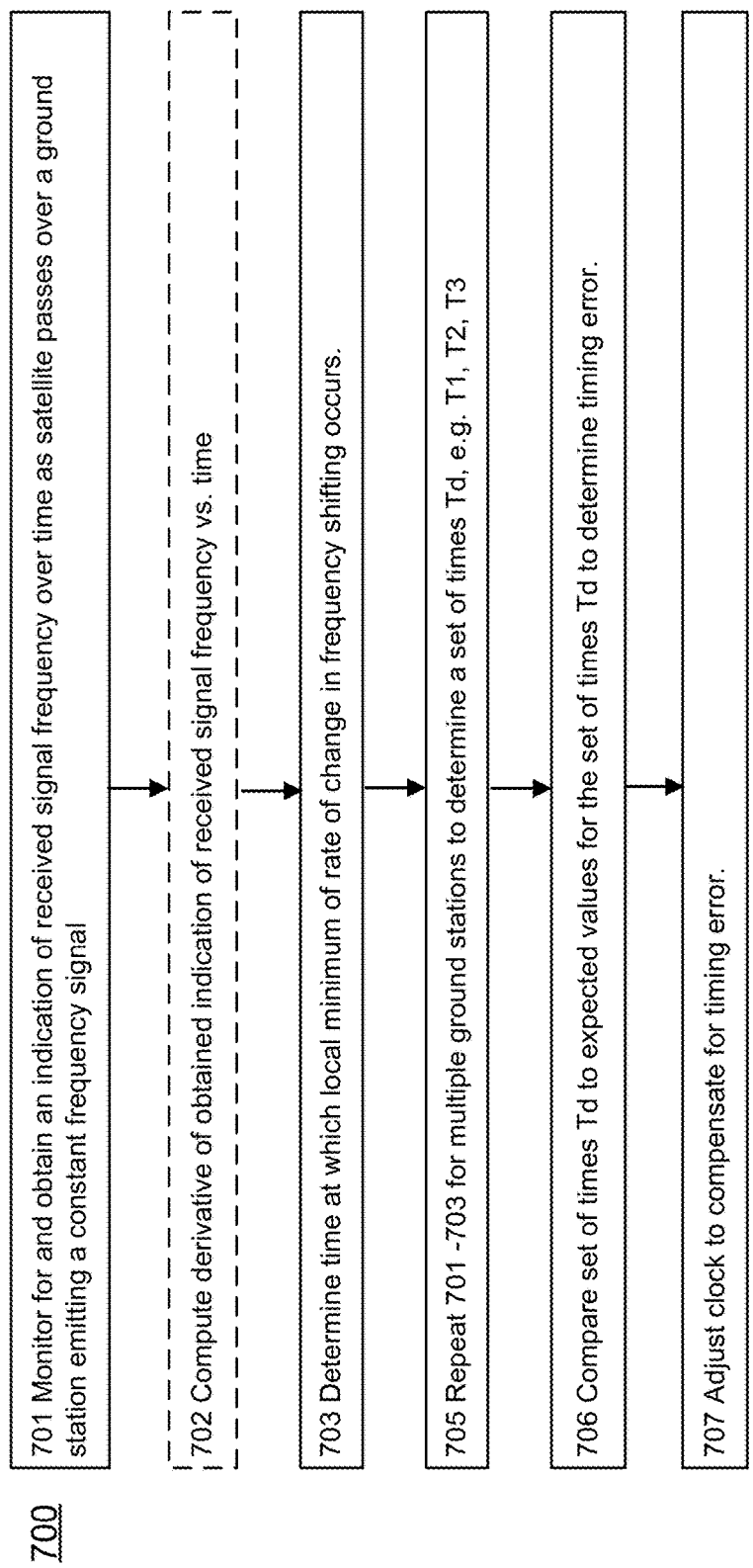
FIG. 7 illustrates a process to compute a timing error between occurrences of signals with minimal Doppler frequency shifting and expected occurrences signals with minimal Doppler frequency shifting, in accordance with embodiments of the present invention.

FIG. 7 is a flow chart representing a process 700 used in embodiments of the present invention, where a satellite makes a single pass over at least three ground stations. In a first step 701, a processor on board a satellite can monitor for and obtain an indication of a received signal's frequency over time as the satellite passes over a ground station emitting a constant frequency signal. Next, the processor can compute 702 a derivative (rate of change) of the obtained indication of the signal frequency over time. (As noted above, the derivative in the signal frequency is equivalent to the derivative in the Doppler shift, at least in absolute value.) The derivative is used to identify a time of occurrence of a local minimum (most negative) of the rate of change. However, in other embodiments, the derivative is not necessarily explicitly computed, but rather other signal processing techniques can be used to identify the time of occurrence of the local minimum of the rate of change. Next, the processor can determine 703 the time at which the local minimum of the rate of change in frequency shifting occurs. This time can equivalently be referred to as a time at which a negative rate of change in observed frequency is maximized. This can be repeated for each ground station to determine 705 a first set of times $T_d$. That is, steps 701 to 703 can be repeated for at least three ground stations of a same timing network, such as to determine 705 $T_d$ for each of three ground stations: $T_1$, $T_2$, and $T_3$.

The processor can then be configured to compare 706 the determined first set of times $T_d$ with expected values for the first set of times. The comparison can involve subtracting each one of the first set of times from its corresponding expected value. The result of the comparison is referred to as a timing error. The expected values for the first set of times can be determined based for example on orbital information held by the satellite and location information for the ground stations transmitting the reference signals. The processor can then adjust 707 the clock to compensate for the timing error. The adjustment can be made in response to each determination of timing error, or following multiple determinations of timing errors. For example, multiple timing errors can determined and passed through a filter, and the clock can be adjusted based on the output of the filter. The clock adjustment can include adjusting an oscillating frequency of the clock, adjusting a compensation value applied to the oscillating frequency, adjusting a count provided by the clock (e.g. a cycle count relative to a zero reference time), or the like, or a combination thereof.

In an embodiment of the present invention where a satellite's oscillator is ovenized, once the correction factor has been calculated with the above process, instead of simply applying the correction factor to match the reception of time signals, the ovenized oscillator's frequency can be adjusted to reduce the offset. In this embodiment, the frequency adjustment can reduce the time-base error before the correction factor of the previous embodiment is applied. Various techniques to determine, mitigate or compensate for clock drift can be applied.

In order to make the proper frequency adjustment, a satellite may be required to make an additional pass over at least one ground station. This will allow the collection of at least a fourth data point of minimal Doppler frequency shift and allow its processor to calculate a drift rate for the oscillator's frequency i.e. the rate of change of the oscillator's frequency with each orbit, The processor can then adjust the oscillator's frequency accordingly. If necessary, the time-base can also be reset again. Further adjustments can be also made based on the measured frequency drift rate.

Figure 8:
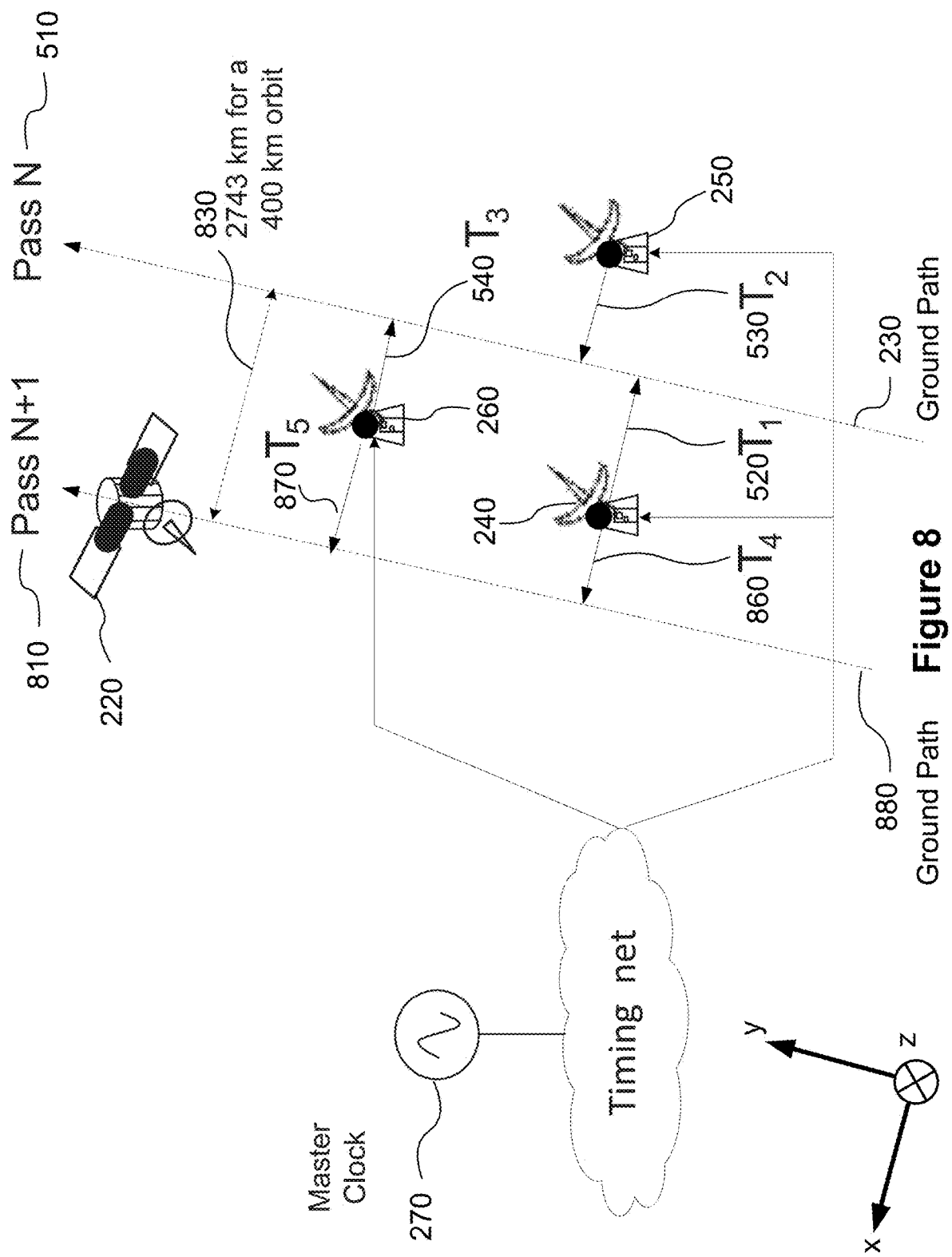
FIG. 8 illustrates a network of ground stations over which a satellite makes an additional pass to collect data over time, in accordance with embodiments of the present invention.

In FIG. 5, $T_1$, $T_2$ and $T_3$ depend on the orbit inclination. FIG. 8 illustrates the same configuration as in FIG. 5, except that the satellite 220 is making an additional pass N+1 810 over the ground stations and now makes a subsequent measurement $T_4$ which, knowing the altitude, can be used to accurately determine the period of the orbit. This is useful to validate the time-base corrections based on $T_1$, $T_2$ and $T_3$. Since it is measured over a longer period of time, it is also useful to estimate and adjust for longer term oscillator drift.

Figure 9:
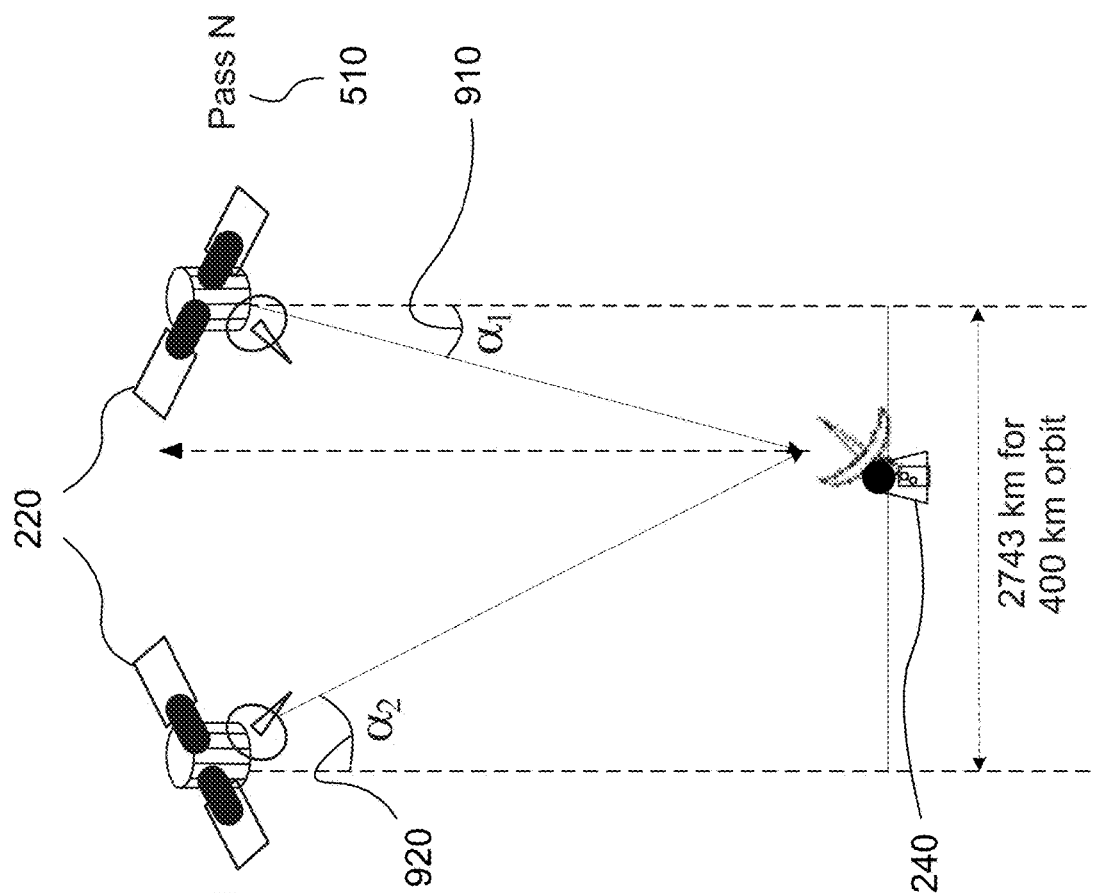
FIG. 9 illustrates a ground station and a satellite passing approximately overhead, in accordance with embodiments of the present invention.

FIG. 9 illustrates the geometry of satellite's position above a ground station as it makes an additional pass. As a satellite 220 passes over a ground station 240 on a pass N 510, an angle $\alpha_1$ is formed 910, as $\alpha$ is defined in FIG. 3. On a subsequent pass N+1 810, an angle $\alpha_2$ 920 is formed instead. Doppler frequency shifting is a function of cos $\alpha \times \cos \beta$. This allows the relative position of the ground station 240 to be determined relative to the pass N 510 and pass N+1 810. If the same estimate is made on $T_3$ 540 and $T_5$ 870 (see FIG. 8) then the relative position of ground station 260 can be determined allowing further opportunity to correct the time-base.

Figure 10:
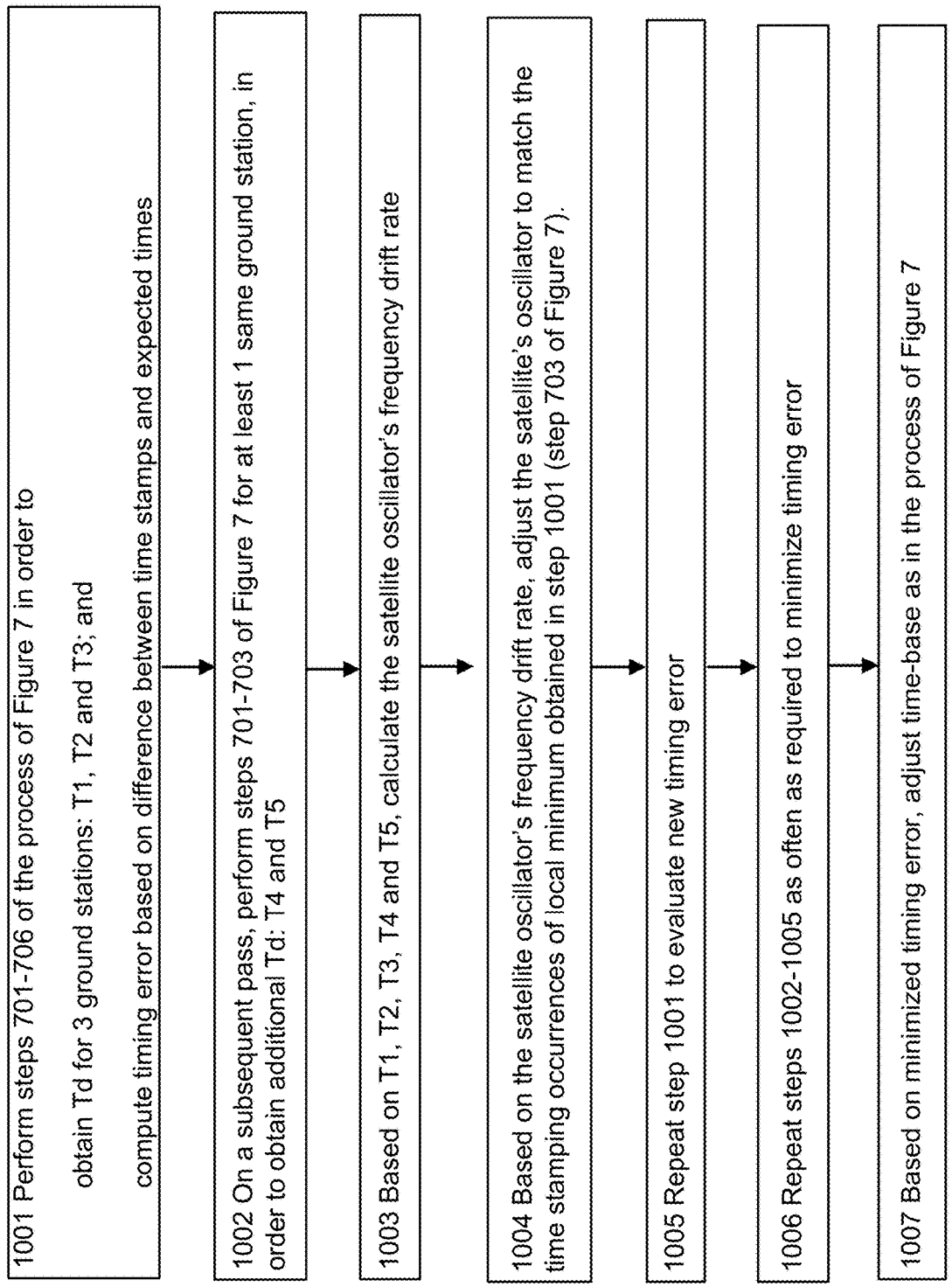
FIG. 10 illustrates a process to synchronize the frequency of a satellite oscillator to a ground station oscillator, in accordance with embodiments of the present invention.

FIG. 10 is a flow chart representing a process used in embodiments of the present invention, where a satellite makes multiple passes over at least three ground stations. First, steps 701 to 706 of the process of FIG. 7 can be performed 1001 in order to obtain $T_d$ for three ground stations, $T_1$, $T_2$ and $T_3$ and determine corresponding timing errors. On a subsequent pass, steps 701 to 703 can be performed 1002 for at least one same ground station, in order to obtain an additional $T_d$: $T_4$. Based on $T_1$, $T_2$, $T_3$, $T_4$ and $T_5$, a processor on the satellite can calculate the satellite oscillator's frequency drift rate 1003. Based on the satellite oscillator's frequency drift rate 1003, the satellite's oscillator can be adjusted 1004 to match the time stamping occurrences of local minimum obtained in step 1001 (step 703 of FIG. 7). Step 1001 then can be repeated 1005 to evaluate a new timing error. Step 1002-1005 can then be repeated 1006 as often as required to minimize the timing error. Based on the timing error, the time-base can be adjusted 1007 as in the process of FIG. 7.

In embodiments of the present invention, a satellite can be part of a network of satellites all having a same altitude, a same orbit, or both, which is approximately circular. It can be noted that the satellites of such a closed-circular train of satellites can all be said to operate in a same frame of reference and this can minimize the relativistic effects on events occurring between the satellites. In particular, the configuration of satellites sharing a same circular orbital path allows the satellites to exchange signals between them as would the nodes of a network located exclusively on the ground. The closer the orbital path is to a perfect circle, the smaller the impact of relativistic effects. However, because the process of FIG. 10 can be repeated as necessary, the relativistic effects may be sufficiently small in a non-circular orbital path as well.

In embodiments of the present invention, the process of frequency synchronization can be performed for each satellite of a same network or subnetwork of satellites having a similar orbital path, and once the oscillator of each satellite is running at a sufficiently same frequency, the satellite oscillators can be said to be "syntonized" with each other, which means that they are synchronized to the same frequency and thus relative time-base errors are potentially minimized.

In embodiments of the present invention where the satellites of a same network having a similar orbital path have been synchronized in frequency to a ground network, and can be said to be synchronized in frequency with each other, then further processes can be applied to the satellite clocks. These further processes can be applied to synchronize multiple satellite clocks with each other. Such synchronization can facilitate other operations of a satellite, such as exchanging routing data or other coordination activities desirable for networking operations or other operations.

In an embodiment of the present invention where each satellite of a same network having a similar orbital path has been synchronized in frequency for example using the process of FIG. 10, the oscillator of one satellite node within the orbit can be selected as a master node and all other satellite oscillators can be synchronized with it in frequency, in a similar manner as would the nodes of a network located entirely on the ground. In particular, synchronizing all of the clocks with a master clock can include a series of synchronization operations, wherein each successive synchronization operation can include synchronizing one of the clocks with another clock which was synchronized in an immediately previous synchronization operation. This manner of frequency synchronization process can be applied as needed to maintain the original frequency synchronization of FIG. 10.

In an embodiment of the present invention where each satellite of a same network having a similar orbital path has been synchronized in frequency, the time-base at this point can still be arbitrary. Therefore, a subsequent process can be to set the time of the satellite clocks, also known as to "time-align" the clocks. Time alignment may refer to adjusting the clocks relative to one another so that they agree with respect to cycle count or "zero" reference time of the clock. In other words, the clocks are synchronized such that they all simultaneously read the same value, while also incrementing said value at the same rate due to frequency synchronization.

In embodiments of the present invention where each satellite of a same network having a similar orbital path has been synchronized in frequency, the process of time-aligning their clocks can be accomplished by electing the clock of one satellite as a master clock, and having the master clock exchange time-stamp messages with the clocks of the other satellites, acting as subordinate devices, in a similar manner as would the nodes of ground network located exclusively on the ground. At this step, a clock synchronization protocol such as NTP or PTP can be used, and PTP can possibly provide higher a resolution. This allows each clock to be adjusted in terms of the time offset, for example corresponding to a count of oscillation cycles from a zero reference time. The mechanisms involved in calculating clock offsets may involve the use of a filter (e.g. a Kalman filter) over a suitable time constant to meet Allan variance at a specific observation period.

In embodiments of the present invention, communicating timing information between satellites of a same orbital path can occur after the clocks are synchronized in frequency, and synchronizing the clocks can consist of synchronizing a time offset for the clocks, In embodiments of the present invention where each satellite of a same network having a similar orbital path has been synchronized in frequency, the method of time-aligning clocks to a common master clock using a clock synchronization protocol has the added benefit that the accumulation of noise in the chain of clocks can be measured by the master clock and a further correction can be made to improve the accuracy of the time-base. Once the master clock, "clock_0" has measured an accumulation of noise for a signal having gone through all the satellites of the train, it can then provide timing information to the next satellite, "clock_1", which can then provide timing information to the subsequent satellite "clock_2", and so on. If the train contains N satellites, the last satellite in the train would be "clock_N-1".

In an embodiment of the present invention, the number of satellites in a similar orbit, and the distances between them are such that the satellites can form a ring around the Earth, and a signal sent by an elected master clock can be relayed by the other satellites until it reaches the master clock again, such that the clock_0 receives a signal from clock N_1. In this embodiment, the noise level represents the accumulation of noise along the entire train of clocks and it can be measured by clock_0 by comparing the noise level received from clock_N-1 with the internal time-base of clock_0. This process can allow a measurement of noise accumulation over the base noise of any selected master clock. With such a process, a satellite holding the master clock can be configured to monitor for an accumulated error occurring in a clock synchronized according to a last one of the series of synchronization operations, and further clock adjustment, clock synchronization, or both, can be performed when an accumulated error is above a predetermined threshold.

In embodiments of the present invention where each satellite of a same network having a similar orbital path has been synchronized in frequency, the clocks of each satellite can successively be elected as the master clock, the noise accumulated in the train of clocks can be measured in each case, and corrections to address the noise can be applied as needed.

In embodiments of the present invention where noise accumulation in a train of satellites is measured, periodic corrections can characterize the impact of an orbit's eccentricity, and increasing the update period can allow lower cost oscillators to be used.

Figure 11:
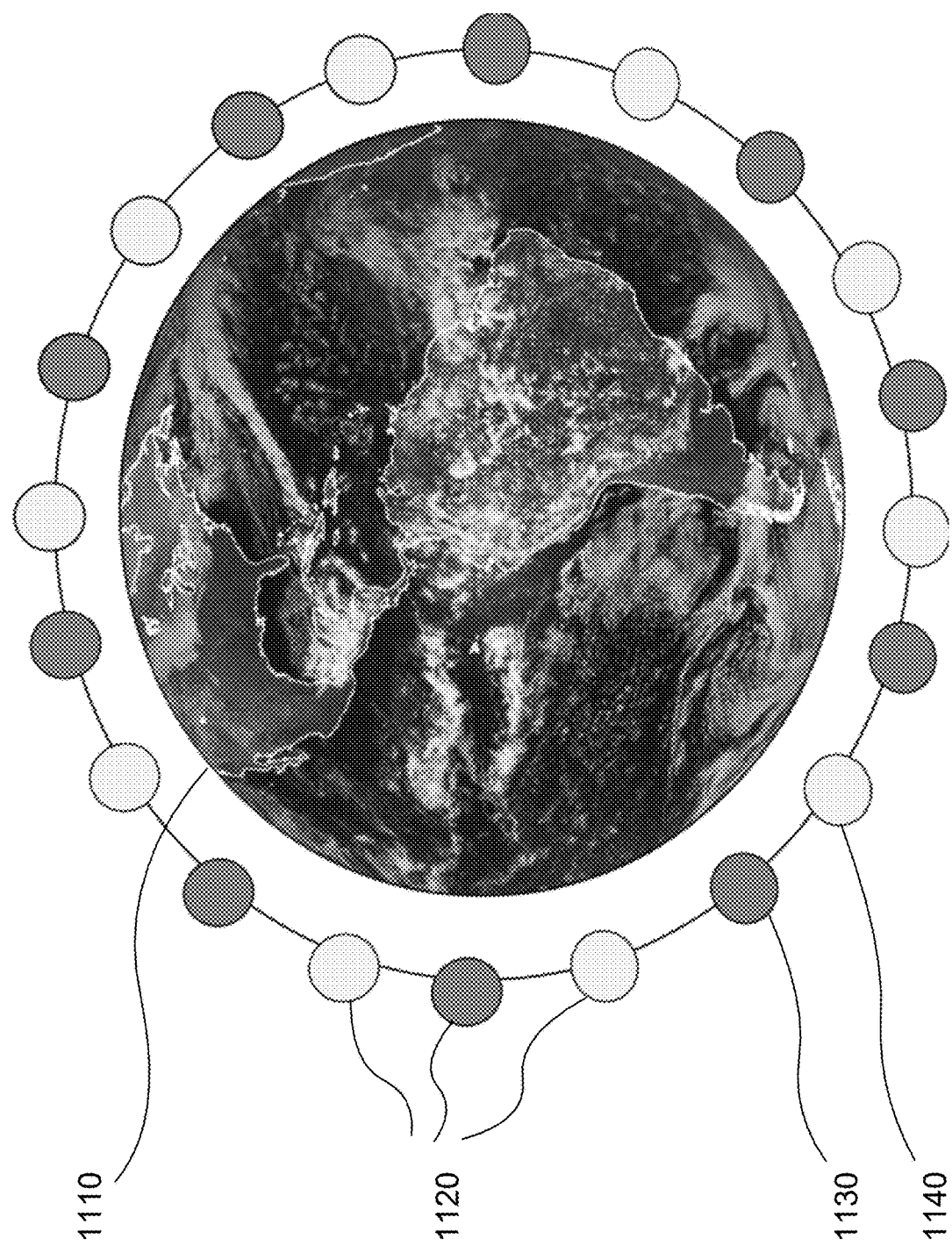
FIG. 11 illustrate the Earth and a train of satellites at a same altitude, in accordance with embodiments of the present invention.

FIG. 11 illustrates the Earth 1110, and a train of N satellites having a similar orbital path, numbered and distanced from each other to form a ring all the way around 1120. One of the satellites is selected to contain clock_0 1130. A signal noise measurement can be obtained by comparing the noise of a signal sent by clock_0, with the noise of the signal after it has been relayed by all the other satellites and sent back by clock_N-1 1140 to clock_0.

In an embodiment of the present invention one of the satellites of a train can be selected as a permanent master node, this node containing a higher quality oscillator as a higher quality frequency reference. The higher quality oscillator can be for example a rubidium or a cesium oscillator. A satellite network's total power consumption and associated weight can therefore be lower than if each satellite was equipped with a same higher quality oscillator.

In an embodiment of the present invention, the oscillator on board each satellite is selected based on safety considerations as a compromise to selecting a higher quality frequency reference, because for example, certain higher quality oscillators may not fully disintegrate on satellite re-entry and thus can represent an increased danger.

In embodiments of the present invention, a network of satellites can include many trains of satellites and a train can be on a same or a different path as another train. Further, some trains can occupy different altitudes as others, despite being part of a same network. The different altitudes can be referred to as a "shells" of the satellite network. In these embodiments, synchronization to a same frequency and a same time can be performed for each train of satellites independently such as to result in a multi-orbit, and multi-shell network in which each satellite has a same frequency and a same time. In one embodiment, once clocks of satellites belonging to each train or orbit are synchronized among each other, clocks of satellites belonging to different trains or orbits are synchronized with one another. In other embodiments, the clocks belonging to one elected train or orbit are synchronized, and then clocks of other trains or orbits are synchronized to the elected train.

Figure 12:
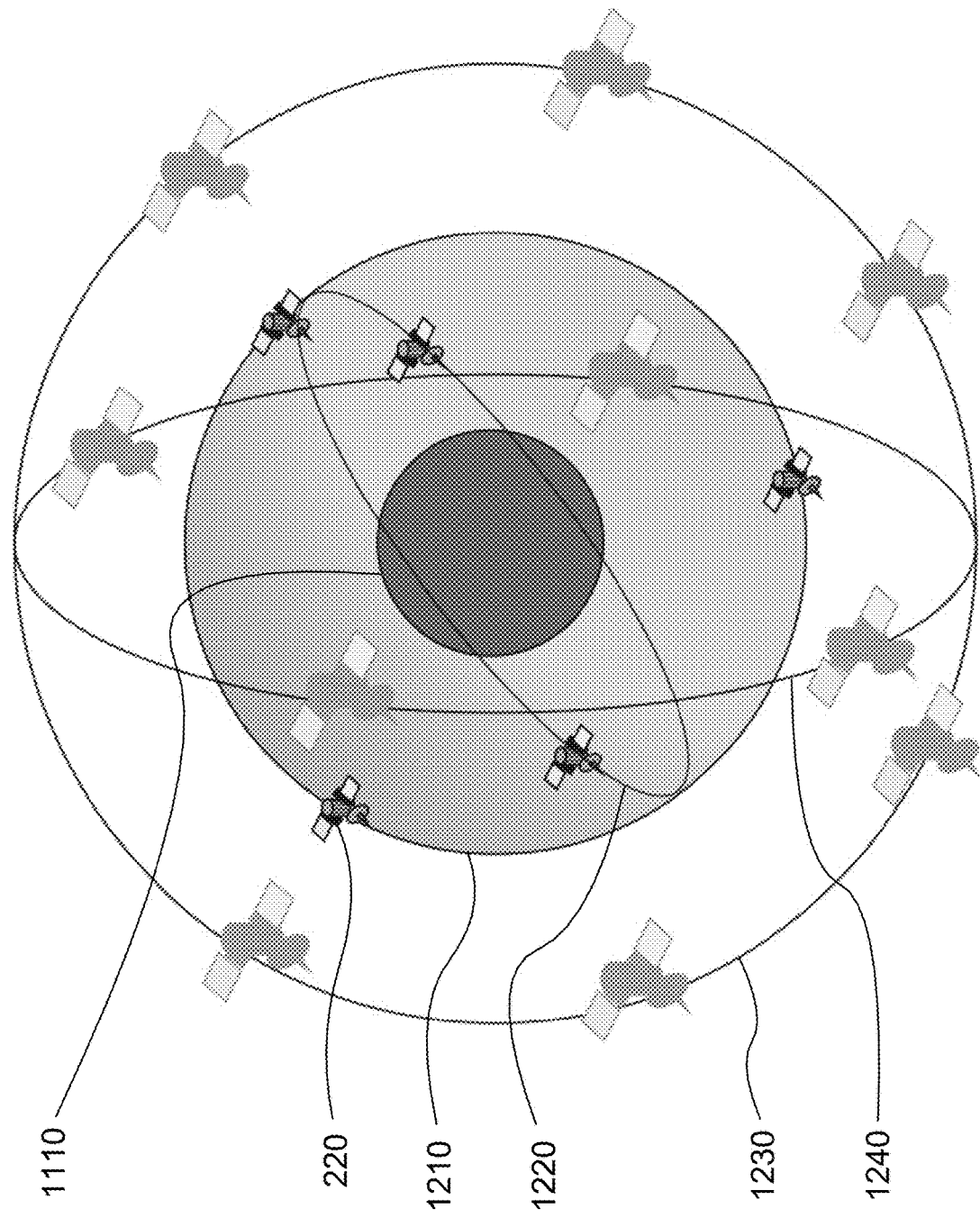
FIG. 12 illustrate the Earth and a network of satellites each of which is orbiting at one of many orbital paths, in accordance with embodiments of the present invention.

FIG. 12 illustrate the Earth 1110 and a network of satellites 220 each of which is orbiting at one of two different altitudes: a lower altitude, and a higher altitude. At the lower altitude, a number of orbits can be present, such as orbit 1210 and orbit 1220, which are part of a first shell. At the higher altitude, a number of orbits can also be present, such as orbit 1230 and orbit 1240, which are part of a second shell. Each shell and each orbit of each shell can be synchronized independently to a same frequency and a same time. For example, groups of satellites belonging to one shell can be synchronized together, independently of the synchronization potentially occurring in other shells.

The above embodiment allows satellites to synchronize to a same frequency and time (a uniform time-base), while considering relativistic effects at an orbiting altitude, including the drift rate of oscillators used in the satellites.

As mentioned above, noise accumulation in a train of N satellites can be measured, and the noise contribution from each oscillator in the train of N satellites can be estimated by allowing each satellite in the orbit to take turns acting as the master clock. In more detail, for a case where the master clock_0 is providing reference timing, a first measurement of noise accumulation can be made by relaying a signal from clock_0 to clock_0 (via a circular path involving an orbital train of satellites). Then, clock_1 can take a turn as master clock as follows: follows: First clock_1 can disable from taking timing from clock_0. Second, clock_1 can signal to clock_0 clock_1's new role as master clock. Third, clock_1 can instruct clock_0 to take timing information from clock_N-1. Clock_1 then becomes an initial source of noise for the entire chain of clocks. Fourth, clock_1 can send a signal to be relayed along the chain of satellites from clock_1 to clock_1. Fifth, the signal relayed back to clock_1 can be compared with the original signal of clock_1, such as to obtain measurement of noise accumulation corresponding to clock_1. The same process can be repeated for all the satellites of a same chain, such as to obtain N measurements of noise accumulation in the chain, one for each of N starting nodes. By comparing the N measurements of noise accumulation, the timing error between any two satellites can be obtained, including two neighboring satellites.

Paradoxically, performing the process with a clock having a very high noise level can result in measurement with the lowest noise, because the high noise contributor is no longer in the chain of clocks. Instead, it compares a relayed signal with its own high-noise, initial signal. Because the highest noise is common to both the highest noise source and the measurement device, the relative noise is lowest.

The process of obtaining a noise accumulation measurement from each satellite of a chain can be repeated as often as necessary and in particular, by performing it periodically, it can allow a determination of how noise accumulation in any satellite varies with time. These measurements can be used to reduce any error in the time synchronization of a train of satellites.

In an embodiment of the present invention, synchronizing satellites clocks in a network of satellites with a clock located on the ground can include exchanging one or more messages with one of more of the base stations. In particular, a message from a ground station to a satellite can include a precision estimator that can estimate the error in the ground-based time-base. The estimator can be added as a message from the ground station to the satellite and allowing a satellite processor to further compensate for additional errors that may be present in the ground distribution network. For example, if there is a failure in the ground synchronization segment, the message can contain this information, along with an estimate of the error, a label allowing the satellite to estimate the error, or both. In some embodiments, depending on the policies set by the satellite network operator, a ground-based time-base failure may require no action at all. An advantage of this embodiment is that it can further reduce the total synchronization error and provide the option of using signals provided from the time-base, as an alternative to signals provided by a GNSS (e.g. GPS).

Embodiments have been described above in conjunctions with aspects of the present invention upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A method for adjusting timing of a clock internal to a satellite in motion relative to ground, the method comprising:
   monitoring, by the satellite, for one or more constant-frequency reference signals transmitted respectively by one or more base stations located on ground;
   determining a first set of times, each being a time at which a negative rate of change in observed frequency of a corresponding one of the reference signals is maximized, said change being due to Doppler effects resulting from said motion;
   determining a timing error of the clock based at least in part on a comparison of the first set of times with an expected set of times indicative of expected values of the first set of times; and
   adjusting the clock to compensate for the timing error.

2. The method of claim 1, wherein the one or more reference signals comprise three or more reference signals transmitted respectively by three or more of said base stations.

3. The method of claim 1, wherein said monitoring comprises monitoring for a first reception of said one of the constant-frequency reference signals during a first pass over a corresponding one of said base stations, and monitoring for a second reception of said one of the constant-frequency reference signals during a second, subsequent pass over said corresponding one of said base stations.

4. The method of claim 3, wherein one of the first set of times corresponds to the first reception, and another one of the first set of times corresponds to the second reception.

5. The method of claim 1, wherein the expected set of times is determined based on orbital dynamics information for the satellite.

6. The method of claim 5, wherein said orbital dynamics information includes one or more of: an altitude of the satellite; an orbital speed of the satellite; and an orbital direction of the satellite.

7. The method of claim 1, wherein adjusting the clock comprises adjusting a frequency of the clock.

8. The method of claim 1, further comprising, following said adjusting the clock, communicating timing information with one or more other satellites to synchronize clocks of the satellite and said other satellites.

9. The method of claim 8, wherein the satellite and the one or more other satellites are located at a same altitude, a same orbit, or both.

10. The method of claim 8, wherein synchronizing said clocks comprises electing a master clock belonging to one of said clocks and synchronizing all of said clocks with the master clock.

11. The method of claim 10, wherein synchronizing all of said clocks with the master clock comprises a series of synchronization operations, wherein each successive synchronization operation comprises synchronizing one of said clocks with another clock which was synchronized in an immediately previous one of the synchronization operations, wherein a satellite holding the master clock is configured to monitor for an accumulated error occurring in a clock synchronized according to a last one of the series of synchronization operations, and wherein further clock adjustment, clock synchronization, or both, is performed when said accumulated error is above a predetermined threshold.

12. The method of claim 8, wherein said communicating timing information occurs after clocks of the satellite and said other satellites are synchronized in frequency, and wherein synchronizing said clocks comprises synchronizing a time offset for the clocks.

13. The method of claim 8, further comprising synchronizing said clocks with a clock located on ground by exchanging one or more messages with one or more of the base stations.

14. A satellite apparatus comprising a clock, processing electronics and a radio interface and configured to:
   monitor, using the radio interface, for one or more constant-frequency reference signals transmitted respectively by one or more base stations located on ground;
   determine, using the processing electronics, a first set of times, each being a time at which a negative rate of change in observed frequency of a corresponding one of the reference signals is maximized, said change being due to Doppler effects resulting from said motion;
   determine, using the processing electronics, a timing error of the clock based at least in part on a comparison of the first set of times with an expected set of times indicative of expected values of the first set of times; and
   adjust, using the processing electronics, the clock to compensate for the timing error.

15. The satellite apparatus of claim 14, wherein the one or more reference signals comprise three or more reference signals transmitted respectively by three or more of said base stations.

16. The satellite apparatus of claim 14, wherein said monitoring comprises monitoring for a first reception of said one of the constant-frequency reference signals during a first pass over a corresponding one of said base stations, and monitoring for a second reception of said one of the constant-frequency reference signals during a second, subsequent pass over said corresponding one of said base stations.

17. The satellite apparatus of claim 14, wherein the expected set of times is determined based on orbital dynamics information for the satellite.

18. The satellite apparatus of claim 14, wherein adjusting the clock comprises adjusting a frequency of the clock.

19. The satellite apparatus of claim 14, further configured, following said adjusting the clock, to communicate timing information with one or more other satellites to synchronize clocks of the satellite and said other satellites.

20. The satellite apparatus of claim 19, wherein synchronizing said clocks comprises electing a master clock belonging to one of said clocks and synchronizing all of said clocks with the master clock.

\* \* \* \* \*